(No Model.) 2 Sheets—Sheet 1.
D. A. RANKINE.
APPARATUS FOR FILTERING WATER.
No. 502,583. Patented Aug. 1, 1893.
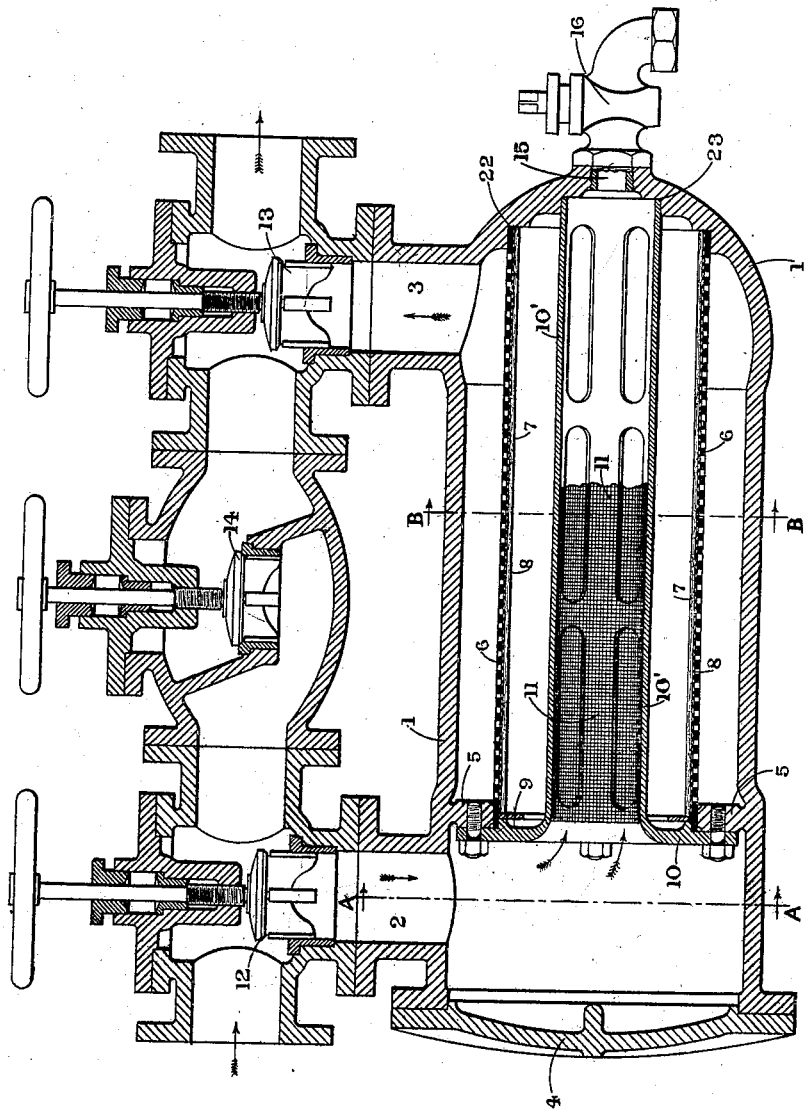
Fig. I.
Attest
Inventor
David A. Rankine
by Ellis Spear
Atty

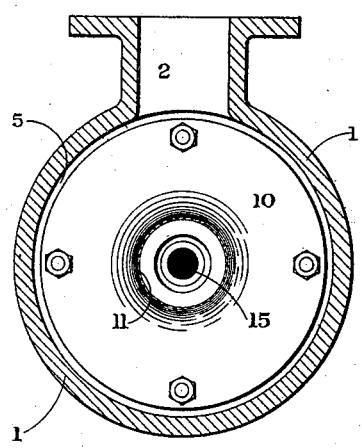
Fig. II
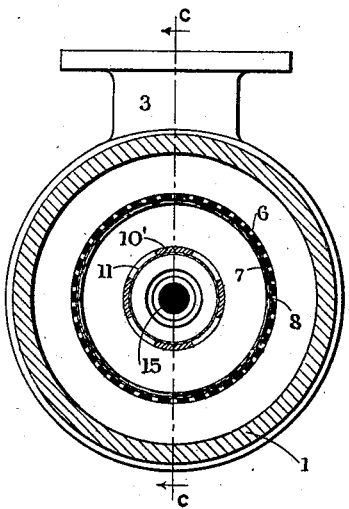
Fig. III
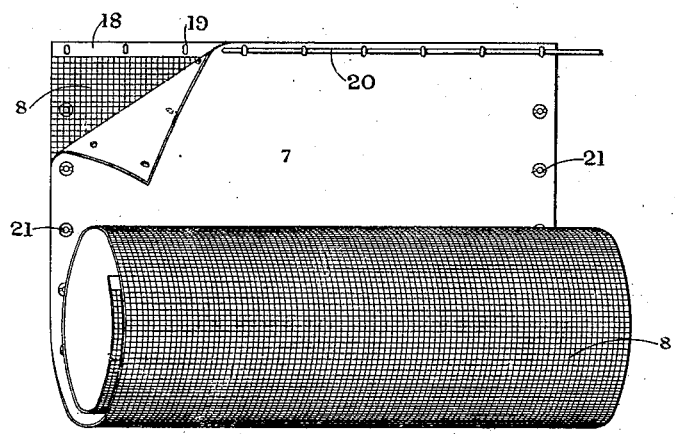
Fig. IV

UNITED STATES PATENT OFFICE.

DAVID A. RANKINE, OF WATERLOO, NEAR LIVERPOOL, ENGLAND.

APPARATUS FOR FILTERING WATER.

SPECIFICATION forming part of Letters Patent No. 502,583, dated August 1, 1893.

Application filed July 13, 1892. Serial No. 439,857. (No model.)

*To all whom it may concern:*

Be it known that I, DAVID ANDREW RANKINE, a subject of the Queen of Great Britain, residing in Waterloo, near Liverpool, in the county of Lancaster, England, have invented certain new and useful Improvements in Apparatus for Filtering Water, especially applicable for filtering feed-water for steam-generators, of which the following is a specification.

This invention has for its object the removal of impurities from water by filtration or straining through suitable media such as flannel or the like and wire gauze, and is especially applicable for the filtration of feed water for steam generators and I will describe it with reference to such application.

In the accompanying drawings which illustrate my invention:—Figure I is a sectional elevation on the line C, C, of Fig. III. Figs. II and III are transverse sections on the lines A, A, and B, B, respectively of Fig. I, the stop valves being omitted. Fig. IV is a detail view showing the manner in which the roll of filtering media is formed.

Throughout the drawings similar parts are indicated by the same reference figures, and in the case of sections, the direction in which they are viewed, is indicated by the small arrows placed adjacent to the letters denoting the plane of section.

I provide a cylindrical casing 1 having an inlet branch 2 for the feed water at one end and an outlet branch 3 for the feed water at the other end; a removable cover 4 is fitted at the end of the casing and the space within the latter is divided by a transverse diaphragm or flange 5 which has a large central opening. Within the casing and concentric therewith I place an open ended tube 6 of perforated plate which acts as a support for the filtering media as hereinafter more fully described; one end of this tube fits closely in the central opening in the diaphragm or flange 5 and the other end fits closely in and is supported by a suitable seating or recess 22 in the wall of the cylindrical casing; under normal circumstances this end of the perforated tube is closed by the seating in which it fits and it will be seen that feed water entering the casing by the inlet branch has to flow through the perforations of the tube on its way to the outlet branch. The filtering media consist of flannel 7 or the like material alternated with wire gauze 8 which is formed, as subsequently described, into a hollow cylindrical roll which is supported by the perforated tube 6. The roll is placed inside the tube 6 and is retained in position by an annular washer 9 and a ring or flange 10 having a central tubular prolongation 10' which extends to the seating 23 at the opposite end of the casing. The ring or flange 10 is jointed firmly against the diaphragm 5 and has a projecting annular flange which serves to locate the perforated tube 6 centrally and to keep the annular washer 9 in position. The wall of the central tube is perforated and it has a loose liner of wire gauze 11 partly shown on the left of Fig. 1 which acts as a strainer and serves to intercept the grosser impurities before arriving at the filtering media.

The inlet and outlet branches 2 and 3 of the apparatus, Fig. I, are controlled by stop valve boxes 12 and 13 which are connected by a pipe forming a by-pass pipe to the apparatus; this by-pass pipe is controlled by a stop valve 14 which is normally closed so that the feed water passes from the inlet 2 to the outlet 3 through the casing and it will be seen that in passing through the casing the feed water has to pass through the perforations of the tube 6 and through the roll of filtering media. When it is desired to throw the filter out of operation, the by-pass valve 14 is opened and the inlet and outlet valves 12 and 13 screwed down. By making the branches of the inlet, by-pass and outlet valves sufficiently long to meet, the by-pass pipe may be dispensed with and some joints saved; this is the arrangement illustrated.

In order to provide for blowing through the apparatus so as to eject the impurities arrested therein and to cleanse the filtering media, I provide a passage 15, through the seating which supports the perforated tube. This passage leads to the outside of the apparatus and is controlled by an external cock 16 and when this cock is opened the feed water entering the apparatus can flow through without passing on to the boiler, and in this way most of the residue arrested in the apparatus can be ejected. The resistance offered to the passage of the feed water through the filter may be indicated in any well known manner. As the filtering media become fouled and the residue accumulates, the resistance will increase and the apparatus is blown through at intervals. When it is found that the filtering media have become so foul that they cannot be cleansed sufficiently by the process of blowing through, the roll can be readily removed and replaced by a fresh one, the apparatus being isolated by closing the valves 12 and 13 and opening 14.

In forming the roll of filtering media I take a sheet of wire gauze 8—preferably brass—and solder a strip of sheet metal 18 along two of its opposite edges. Small eyelets 19 are secured to these strips and the flannel or other filtering material 7 is laid over the gauze, the eyelets pushed through and the whole secured by passing light rods or skewers 20 through the two sets of eyelets. The flannel or the like may be elsewhere further secured by short flat headed pins 21 with washers secured by split pins, and the whole rolled up into a cylindrical roll of one or more convolutions which fits, as already described, either inside or outside the perforated tube 6; either the flannel or the gauze may be rolled outside as may be preferred. In some cases I find it advantageous to substitute for the flannel "bath" or "turkey" towel material as this material is better adapted to resist high temperatures. It will be seen that the construction described permits a very large filtering area to be inclosed within a casing of comparatively small volume and in particular, of comparatively small diameter.

The filter is preferably placed on the delivery side of the feed pump although it may be placed on the suction side if preferred.

While I have described my invention with reference to boiler feed water it is to be understood that it is capable of application generally where it is desired to filter water.

Having now fully described my invention, what I claim, and desire to secure by Letters Patent, is—

1. The combination of the casing, the roll of filtering media, the outer perforated tube and the annular plate 10 detachably secured to the annular diaphragm 5 and adapted to locate the said roll and tube in position and having an inner perforated tubular extension provided with a wire gauze liner both the said inner and outer perforated tubes being seated against the end wall of the casing substantially as described.

2. The herein described filtering media which consist of a sheet of wire gauze of suitable dimensions with two metallic strips 18 at opposite sides having eyelets 19 and a sheet of flannel, cotton or linen fabric attached to said sheet of gauze by means of the eyelets 19, skewers 20 and pins 21 substantially as described.

3. In combination, the casing, the roll of filtering media, the outer perforated tube, and the inner perforated tube having a plate 10, at one end adapted to be attached to the casing both the inner and outer tubes being seated against the end wall of the casing, substantially as described.

In testimony whereof I have hereunto set my hand in the presence of two subscribing witnesses.

DAVID A. RANKINE.

Witnesses:
J. E. LLOYD BARNES,
JOHN N. DOWNWARD,
*Both of 26 Castle Street, Liverpool.*